United States Patent [19]
Petrinec

[11] Patent Number: 5,264,983
[45] Date of Patent: Nov. 23, 1993

[54] MONOLITHIC CAPACITOR WITH VARIABLE CAPACITANCE

[75] Inventor: John Petrinec, Valencia, Calif.
[73] Assignee: Johanson Dielectrics, Inc., Burbank, Calif.
[21] Appl. No.: 762,617
[22] Filed: Sep. 19, 1991
[51] Int. Cl.⁵ .................... H01G 5/00; H01G 7/00
[52] U.S. Cl. .................... 361/277; 29/25.42; 361/271
[58] Field of Search .......... 361/277, 271, 320, 321, 361/304, 308, 309, 310, 330; 29/25.42

[56] References Cited

U.S. PATENT DOCUMENTS

| | | | |
|---|---|---|---|
| 3,694,710 | 9/1972 | Kirschner | 361/321 |
| 3,821,617 | 6/1974 | Shelby et al. | 29/25.42 X |
| 3,836,830 | 9/1974 | Akopian et al. | 361/304 |
| 4,924,064 | 5/1990 | Stormbom et al. | 361/305 X |
| 5,034,851 | 7/1991 | Monsorno et al. | 361/321 |

Primary Examiner—Bruce A. Reynolds
Assistant Examiner—Michael D. Switzer
Attorney, Agent, or Firm—Lyon & Lyon

[57] ABSTRACT

A monolithic capacitor whose capacitance can be varied by removing part of an electrode. The capacitor may comprise an end termination, coupled to a plurality of internal electrodes which are disposed in a dielectric, and a top electrode which is disposed on one side of the dielectric. If a part of the top electrode is removed, the capacitance of the monolithic capacitor is changed, without an unacceptable change in "Q". The top electrode may be disposed so that a part of it may be removed with an energy beam device, such as a laser or a particle beam.

12 Claims, 1 Drawing Sheet

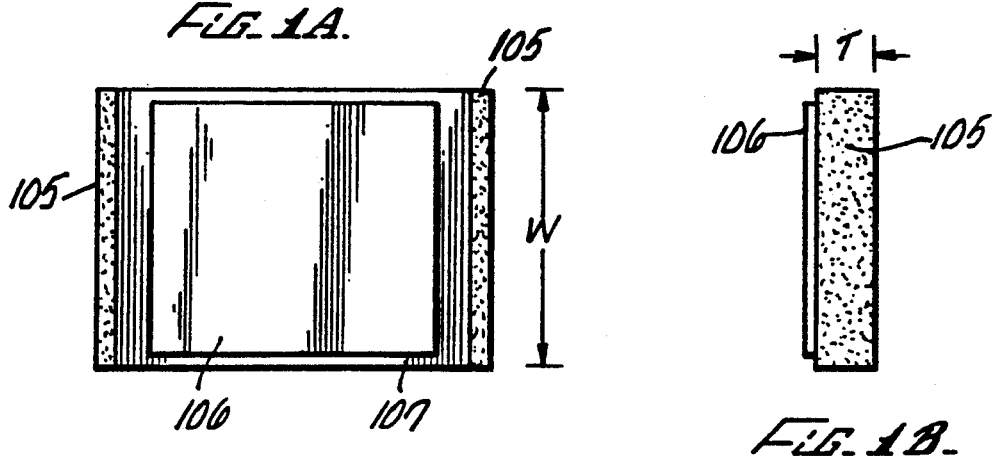
FIG. 1A.
FIG. 1B.
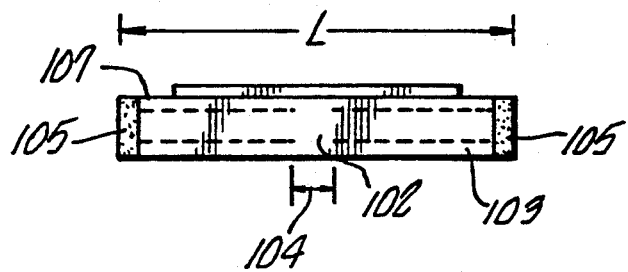
FIG. 1C.
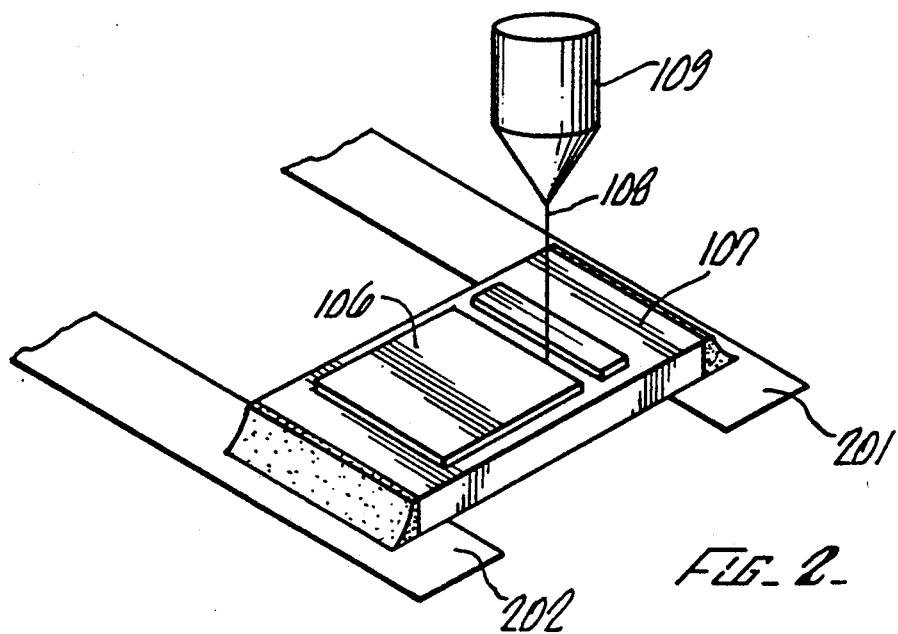
FIG. 2.

MONOLITHIC CAPACITOR WITH VARIABLE CAPACITANCE

BACKGROUND OF THE INVENTION

Field of the Invention

This invention relates to monolithic capacitors, and specifically to monolithic capacitors whose capacitance can be varied by removing part of an electrode.

Description of Related Art

In oscillators and other circuits, the characteristics of the circuit may be strongly affected by the capacitance of one or more capacitors in the circuit. It would be advantageous to have a capacitor whose capacitance could be adjusted dynamically, so as to fit with other components in the circuit. Ideally, the capacitor could be adjusted while still coupled to the circuit, so that the circuit itself could be tuned to a desired state by adjusting the capacitance of the capacitor.

Prior programmable capacitors have had the drawback that the quality facts "Q" may be altered substantially, in the desired frequency range of the capacitor, when the capacitance of the capacitor is altered. "Q" may be defined as the inverse of the product $2\pi$ f C Rs, where f=operating frequency of the capacitor, C=capacitance of the capacitor, and Rs =equivalent series resistance of the capacitor. This may be particularly noticeable when the electrodes are coupled only in a parallel configuration.

It would also be advantageous to have a capacitor which could be surface mounted by automated equipment, such as from automatic tape and reel packaging, or by robotic devices. In such case, it would be advantageous to be able to adjust the capacitor from the top exposed side, and to be able to use reflow soldering processes once the capacitor has been adjusted. Prior programmable capacitors have had the drawback that they must be adjusted from a side, or from a particular orientation of the capacitor, and have also had the drawback that reflow solder will wet the capacitor pad or bridge across the capacitor plates.

One programmable capacitor which has been used in the United States comprises a body of dielectric with electrodes disposed on the top surface and the bottom surface, but with an the electrode on the bottom surface having a gap in the middle. In this structure, the electrode on the top surface may be eroded, e.g. by a laser, to reduce capacitance. However, this structure is relatively thin, and therefore fragile, which has the following drawbacks: (1) Because the structure is fragile, it is difficult to mount by automated equipment, such as automatic tape and reel packaging. (2) Achieving high capacitance is difficult, because this would require an even thinner and more fragile structure.

Accordingly, it is an object of the invention to provide a monolithic capacitor with variable capacitance.

SUMMARY OF THE INVENTION

The invention provides a monolithic capacitor whose capacitance can be varied by removing part of an electrode. The capacitor may comprise an end termination, coupled to a plurality of internal electrodes which are disposed in a dielectric, and a top electrode which is disposed on one side of the dielectric, not in contact with the end termination. If a part of the top electrode is removed, the capacitance of the monolithic capacitor is changed, without an unacceptable change in "Q". In a preferred embodiment, the top electrode may be disposed so that a part of it may be removed with an energy beam device, such as a laser or a particle beam.

BRIEF DESCRIPTION OF THE DRAWINGS

FIGS. 1A, 1B and 1C are collectively referred to herein as "FIG. 1." FIG. 1 shows a view of a monolithic capacitor.

FIG. 2 shows a perspective view of a monolithic capacitor, showing a method of altering its capacitance.

DESCRIPTION OF THE PREFERRED EMBODIMENT

FIGS. 1A, 1B and 1C are collectively referred to herein as "FIG. 1." FIG. 1 shows a view of a monlithic capacitor.

A surface mount monolithic capacitor 101 may comprise a dielectric 102, into which are embedded a plurality of internal electrodes 103. The internal electrodes 103 may each comprise a substantially flat plate with a gap 104 in the middle. The internal electrodes 103 may be coupled to a pair of end terminations 105, but not coupled to each other. A top electrode 106 may be disposed on a side 107 of the dielectric 102, preferably so that it is exposed to an energy beam 108 from an energy beam device 109 (see FIG. 2).

In a preferred embodiment, elements of the monolithic capacitor 101 may have dimensions and tolerances as shown in the figure.

In different embodiments the dielectric 102 may comprise any suitable dielectric; however, in a preferred embodiment, the dielectric 102 may comprise any known dielectric with an insulation resistance of more than about 10 gigohms (such as those made by DuPont Solid State Dielectrics), such as a high-fire NPO composition. In a preferred embodiment, the dielectric may comprise an NPO dielectric such as barium titanate, with a temperature/capacitance coefficient of about zero $+/-30$ ppm per degree C.

In a preferred embodiment, the internal electrodes 103, the end terminations 105 and the top electrode 106 may comprise glass-free noble metals, such as an alloy of gold, palladium or platinum (such as product number 1220 made by Degussa Corporation of South Plainfield, N.J.).

Two internal electrodes 103 are shown in the figure; however, three or more internal electrodes 103 may be used. In that case, the third and further internal electrodes 103 would be disposed in the dielectric 102 below the lower internal electrode 103 shown in the figure. In a preferred embodiment, the third and further internal electrodes 103 would be spaced apart from the lower internal electrode 103 by an distance about equal to the distance between the upper internal electrode 103 and the lower internal electrode 103, although other spacings would be workable.

In a preferred embodiment, the monolithic capacitor 101 may be constructed by a thick film screening process, in which each layer may be individually filmed and then stacked, as is well known in the art. For example, a double layer of dielectric may be laid down from a sheet of tape, and metal/powder paste may be used for electrodes, as is well known in the art.

FIG. 2 shows a perspective view of a monolithic capacitor, showing a method of altering its capacitance.

The monolithic capacitor 101 may be coupled between a first node 201 and a second node 202 (by coupling one end termination 105 to the first node 201 and coupling another end termination 105 to the second node 202) with its top electrode 106 exposed to the energy beam device 109 (such as a laser or a particle beam). If a part of the top electrode 106 is removed, the capacitance of the monolithic capacitor 101 will be reduced, without unacceptable change in "Q".

In a preferred embodiment, the energy beam device 109 may comprise a laser (such as a YAG laser made by Chicago Laser of Chicago, Ill.). It may also comprise an ion beam device, a microsandblaster, or any similar device which can remove part of the top electrode 106 without destroying the rest of the monolithic capacitor 101, e.g. by eroding the top electrode 106.

In a preferred embodiment, the part of the top electrode 106 which overlies the gaps 104 in the internal electrodes 103 is not removed, and the top electrode 106 may be eroded from the pair of sides 107 of the monolithic capacitor 101 which are symmetric with respect to the gaps 104.

The amount of the top electrode 106 which is removed may vary, and may be chosen either by predetermined design or in response to measurements made while the monolithic capacitor 101 is being altered. For example, the monolithic capacitor 101 may be coupled to an oscillator circuit with the purpose of tuning the oscillator circuit to a predetermined center frequency. In that case, only that part of the top electrode 106 sufficient to tune the oscillator to the predetermined center frequency might be removed. Other and further applications of this concept would be clear to one of ordinary skill in the art, after perusal of the specification, drawings and claims herein, and are within the scope and spirit of the invention.

ALTERNATIVE EMBODIMENTS

While preferred embodiments are disclosed herein, many variations are possible which remain within the concept and scope of the invention, and these variations would become clear to one of ordinary skill in the art after perusal of the specification, drawings and claims herein.

I claim:
1. A monolithic capacitor, comprising
   a body of dielectric;
   a top electrode disposed adjacent to said body of dielectric;
   a plurality of internal electrodes underlying said top electrode and each having a single gap disposed therein such that each electrode traverses the width of the dielectric body between two end terminations except for said gap;
   a first end termination coupled to a first part of each said internal electrode, and a second end termination coupled to a second part of each said internal electrode.
2. A monolithic capacitor, comprising
   a body of dielectric having a top surface;
   a plurality of internal electrodes disposed below said top surface, each said internal electrode comprising a first part and a second part separated by a single gap such that each electrode traverses the width of the dielectric body between two end terminations except for said gap;
   a first end termination coupled to said first part of substantially all said internal electrodes, and a second end termination coupled to second part of substantially all said internal electrodes; and
   a top electrode disposed on said top surface.
3. A monolithic capacitor, comprising
   a body of dielectric having a plurality of sides and having a surface;
   a first end termination disposed on a first side of said body of dielectric and a second end termination disposed on a second side of said body of dielectric;
   a plurality of internal electrodes disposed within said body of dielectric, each said internal electrode comprising a relatively flat plate with a single gap, each said internal electrode coupled to said first end termination and to said second end termination such that each electrode traverses the width of the dielectric body between two end terminations except for said gap; and
   a top electrode disposed on said surface.
4. A monolithic capacitor, comprising
   a body of dielectric forming a rectilinear volume which is substantially wider than it is high, having a plurality of sides, and having a top surface capable of being exposed to an energy beam;
   a plurality of conductive internal electrodes disposed in parallel with said top surface, each said internal electrode comprising a substantially flat plate with a single gap such that each electrode traverses the width of the dielectric body between two end terminations except for said gap, said gaps being substantially aligned;
   a first conductive end termination disposed on a first side of said body of dielectric and coupled to each said internal electrode on a first side of said gap, and a second conductive end termination disposed on a second side of said body of dielectric and coupled to each said internal electrode on a second side of said gap; and
   a conductive top electrode disposed on said surface overlying each said internal electrode on both said first side and said second side of said gap, and without contacting said first end termination and said second end termination.
5. A method of altering the capacitance of a capacitor in a circuit, comprising the steps of
   forming a monolithic capacitor having a top electrode, a plurality of internal electrodes underlying said top electrode and each having a single gap disposed therein such that each electrode traverses the width of the dielectric body between two end terminations except for said gap, and first and second end terminations coupled to each said internal electrode;
   coupling said first end termination to a first node in said circuit, and coupling said second end termination to a second node in said circuit; and
   removing a part of said top electrode.
6. A method of altering the capacitance of a capacitor in a circuit, comprising the steps of
   forming a monolithic capacitor, said monolithic capacitor having (a) a body of dielectric forming a rectilinear volume which is substantially wider than it is high, having a plurality of sides, and having a top surface capable of being exposed to an energy beam, (b) a plurality of conductive internal electrodes disposed in parallel with said top surface, each said internal electrode comprising an substantially flat plate with a single gap, said gaps being substantially aligned such that each electrode traverse the width of the dielectric body between two end terminations except for said gap, (c) a first conductive end termination disposed on a first side of said body of dielectric and coupled to each said internal electrode on a first side of said gap, and a second conductive end termination disposed on a second side of said body of dielectric and coupled to each said internal electrode on a second side of said gap, and (d) a conductive top electrode disposed on said surface overlying each said internal electrode on both said first side and said second side of said gap, and without contacting said first end termination and said second end termination;

coupling said first end termination to a first node in said circuit, and coupling said second end termination to a second node in said circuit; and directing an energy beam to remove a first part of said top electrode on said first side of said gap, and to remove a second part of said top electrode on said second side of said gap, whereby the capacitance of said monolithic capacitor is reduced.

7. A monolithic capacitor, comprising a body of dielectric having at least one end termination;

a top electrode disposed adjacent to said body of dielectric in a plane;

a plurality of internal electrodes underlying said top electrode such that no said internal electrodes not of the same polarity at any moment in time lie in a direction perpendicular to said plane in which said top electrode lies, each said internal electrode being coupled to a said end termination.

8. A monolithic capacitor as in claim 7, wherein the plurality of internal electrodes underlying said top electrode each have a single gap disposed therein such that each electrode traverses the width of the dielectric body between two end terminations except for said gap.

9. A monolithic capacitor as in claim 8 wherein said gaps are substantially aligned.

10. A monolithic capacitor as in claim 8 wherein a first end termination is coupled to a first part of each said internal electrode, and a second end termination is coupled to a second part of each said internal electrode.

11. A monolithic capacitor as in claim 10 wherein said top electrode overlying each said internal electrode does not contact said first end termination and said second end termination.

12. A method of altering the capacitance of a capacitor in a circuit, comprising the steps of forming a monolithic capacitor having a top electrode in a plane, a plurality of internal electrodes underlying said top electrode such that no said internal electrodes not of the same polarity at any moment in time lie in a direction perpendicular to the plane in which said top electrode lies, one end termination coupled to each said internal electrode, and a second end termination coupled to one of each said internal electrodes and said top electrode;

coupling said first end termination to a first node in said circuit, and coupling said second end termination to a second node in said circuit; and removing a part of said top electrode.

* * * * *